United States Patent [19]

Thompson

[11] 4,296,897
[45] Oct. 27, 1981

[54] BRAKE TORQUE LIMITER

[75] Inventor: Bernard B. Thompson, Bainbridge Island, Wash.

[73] Assignee: The Boeing Company, Seattle, Wash.

[21] Appl. No.: 5,253

[22] Filed: Jan. 22, 1979

[51] Int. Cl.³ .................. B60T 8/12; B64C 25/46
[52] U.S. Cl. ...................... 244/111; 188/181 T
[58] Field of Search ............ 244/111; 188/134, 181 T, 188/195; 303/22 R, 112

[56] References Cited

U.S. PATENT DOCUMENTS

| | | | |
|---|---|---|---|
| 2,904,136 | 9/1959 | Greenough | 244/111 |
| 3,369,635 | 2/1968 | Davis | 303/112 |
| 3,724,610 | 4/1973 | Caero | 188/181 T |
| 3,953,081 | 4/1976 | King | 188/181 T |
| 4,043,607 | 8/1977 | Signorelli | 244/111 |
| 4,129,202 | 12/1978 | Winters et al. | 188/181 T |

*Primary Examiner*—Galen L. Barefoot
*Attorney, Agent, or Firm*—H. Gus Hartmann; Bernard A. Donahue

[57] ABSTRACT

A brake system wherein a manually operated foot pedal actuates a metering valve that controls the pressure magnitude of fluid applied to a set of main brake pistons which push stator brake plates against rotating brake plates resulting in wheel braking torque; and further wherein a force balanced piston and a control valve, modulates the fluid pressure applied to the set of main brake pistons in response to wheel braking torque reaction, such that maximum brake torque is limited in direct proportion to the magnitude of pressure metered.

6 Claims, 8 Drawing Figures

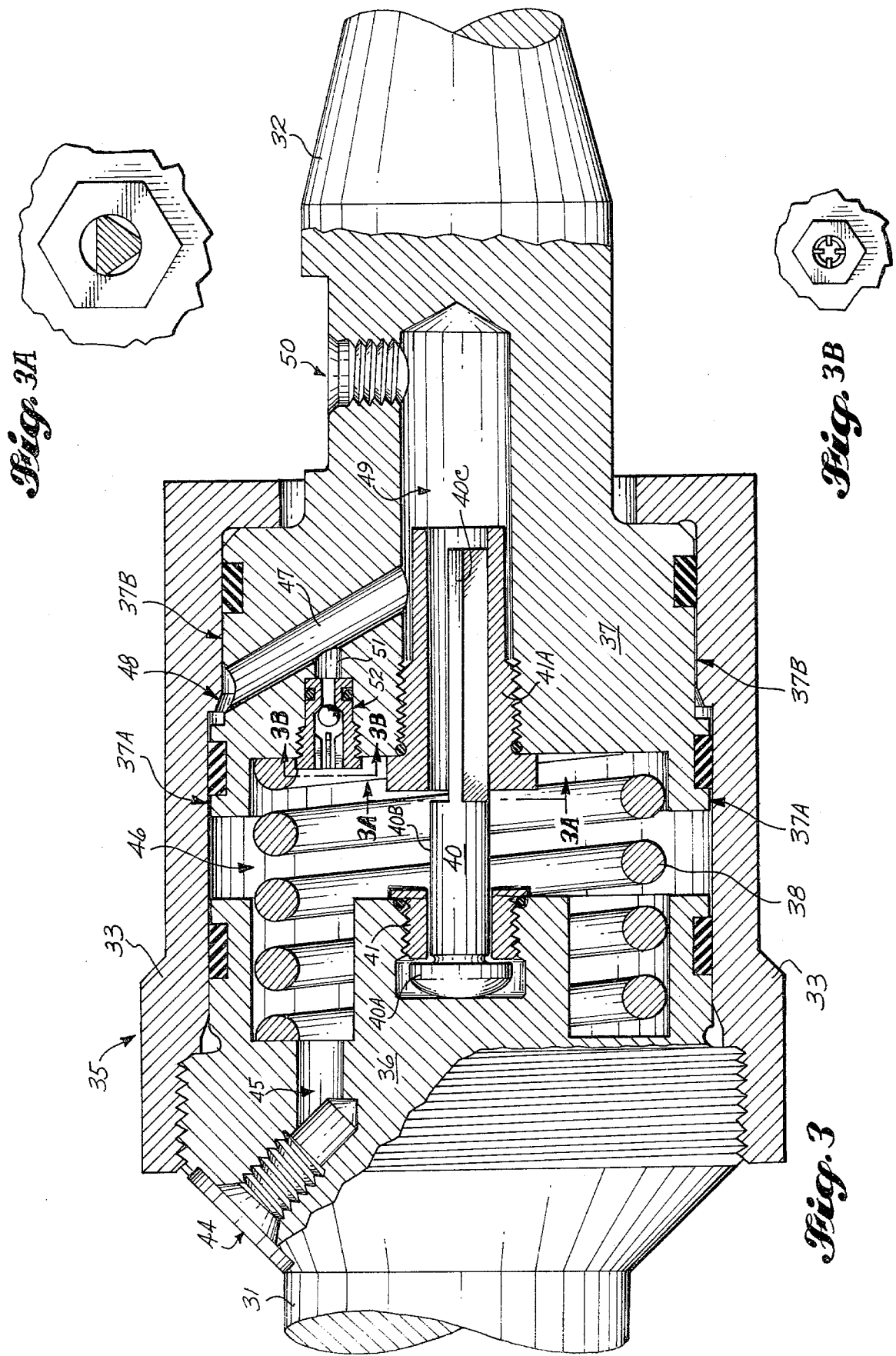

BRAKE TORQUE LIMITER

BACKGROUND OF THE INVENTION

There is an FAA (Federal Aviation Administration) regulation regarding the design strength of landing gear for transport airplanes, which requires that the landing gear drag load be designed such as "A drag reaction equal to the vertical reaction multiplied by a coefficient of friction of 0.8, must be combined with the vertical ground reaction and applied at the ground contact point." This means that the entire landing gear assembly, including its structural connection to the airplane, must be designed for a braking drag load force based on eight tenths of the vertical weight down on the landing gear.

There is also an FAA regulation that states "A drag reaction lower than that prescribed—may be used if it is substantiated that an effective drag force of 0.8 times the vertical reaction cannot be attained under any likely loading condition." Therefore, a substantial weight savings can be realized if the landing gear assembly and its structural support can be designed to a ground coefficient of 0.5 to 0.6, which is still above the average actual of about 0.4. However, to comply with the FAA regulations it is required to prove that the 0.8 friction coefficient will not occur; and this can't really be proven for all conditions. So, another position would be to design a brake controller such that the braking torque will not generate a ground coefficient of friction greater than the supporting structure is designed for.

It is typical in the operation of airplane brakes, that they will have a high braking torque when they are cold and as the brakes warm up, the torque decreases; and as the rotation of the wheels ceases, the torque again increases. Also, the design engineer is faced with the problem of providing an airplane braking system that will produce enough torque for the situation of a long hot roll RTO (Refused Take Off) and yet not exceed the torque that generally results from rapid application of a cold brake in an emergency stopping situation where it is necessary that the brake produce the torque required for the minimum stopping distance and yet not exceed the torque that the landing gear assembly is designed for.

Further, some of the recent developments in lining materials and heat sinks have an even worse variation between running torque and peak torque than current conventional steel brakes e.g., structural carbon brakes have a ratio of heat absorption-to-weight, that is much better than conventional steel disk brake types. For an aircraft the size of a Boeing 747, there could be about a 1,600 lbs. weight savings. However, the trouble with carbon brakes is that when they are wet, they have a relatively low torque in comparison to the torque when dry. In order to compensate for this wide variation in torque between wet and dry operation, the brake pistons have to be built large enough to produce adequate torque when the brakes are wet. However, when the brakes are then operated in the dry condition, the torque produced will exceed the design limit and it becomes necessary to put more weight back into the landing gear assembly and airplane structural support to provide the necessary strength for reacting the high torque load; therefore, the advantages of using carbon brakes is compromised.

SUMMARY OF THE INVENTION

Manual operation of aircraft hydraulic brakes is usually accomplished by the pilot operating a foot actuated valve which applies hydraulic pressure to a set of pistons that push stator brake plates against rotating brake plates. Hydraulically actuated aircraft wheel brakes have a wide torque variation relative to the applied fluid pressure. This is due primarily to the random conditions of temperature, wear, moisture, tolerance, etc.; and it is desirable to control, the amount of brake torque reaction relative to the applied fluid pressure, within narrow limits in order to permit optimum stress design of aircraft structural elements.

Broadly, the invention relates to a wheel braking system wherein an input fluid pressure is directed through a Brake Torque Limiter, to a wheel brake mechanism and produces a brake torque. The reaction of the brake torque amd the input fluid pressure are compared by the Brake Torque Limiter. If the brake torque reaction is greater than a predetermined amount, which has been designed as a function of the fluid pressure input, then the Brake Torque Limiter reduces fluid pressure input to the wheel brake mechanism for adjusting the brake torque to the design value.

The object of the present invention is to provide a Brake Torque Limiter which will guaranty that the braking torque will never exceed a predetermined design limit value; thereby, providing assurance in complying the FAA regulations that the structural strength of the landing gear assembly in adequate for all braking operations and runway conditions.

An object of the present Brake Torque Limiter invention is to guaranty that the wheel braking torque never exceeds the design limit load value of the landing gear.

BRIEF DESCRIPTION OF THE DRAWINGS

FIG. 3 is an enlarged detailed side cross-section view of a Brake Torque Limiter (BTL) which is shown incorporated in the brake rod assembly 30 shown in FIG. 1 and which functions in compression. Note: the brake rod assembly 30 in FIG. 3 is depicted in a reversed position from that shown in FIG. 1 e.g., element 31 is to the right in FIG. 1 and to the left in FIG. 3.

FIG. 3A is a sectional view taken in the direction indicated by 3A—3A in FIG. 3.

FIG. 3B is a sectional view taken in the direction indicated by 3B–3B in FIG. 3.

DESCRIPTION OF THE PREFERRED EMBODIMENTS

Figure 1:
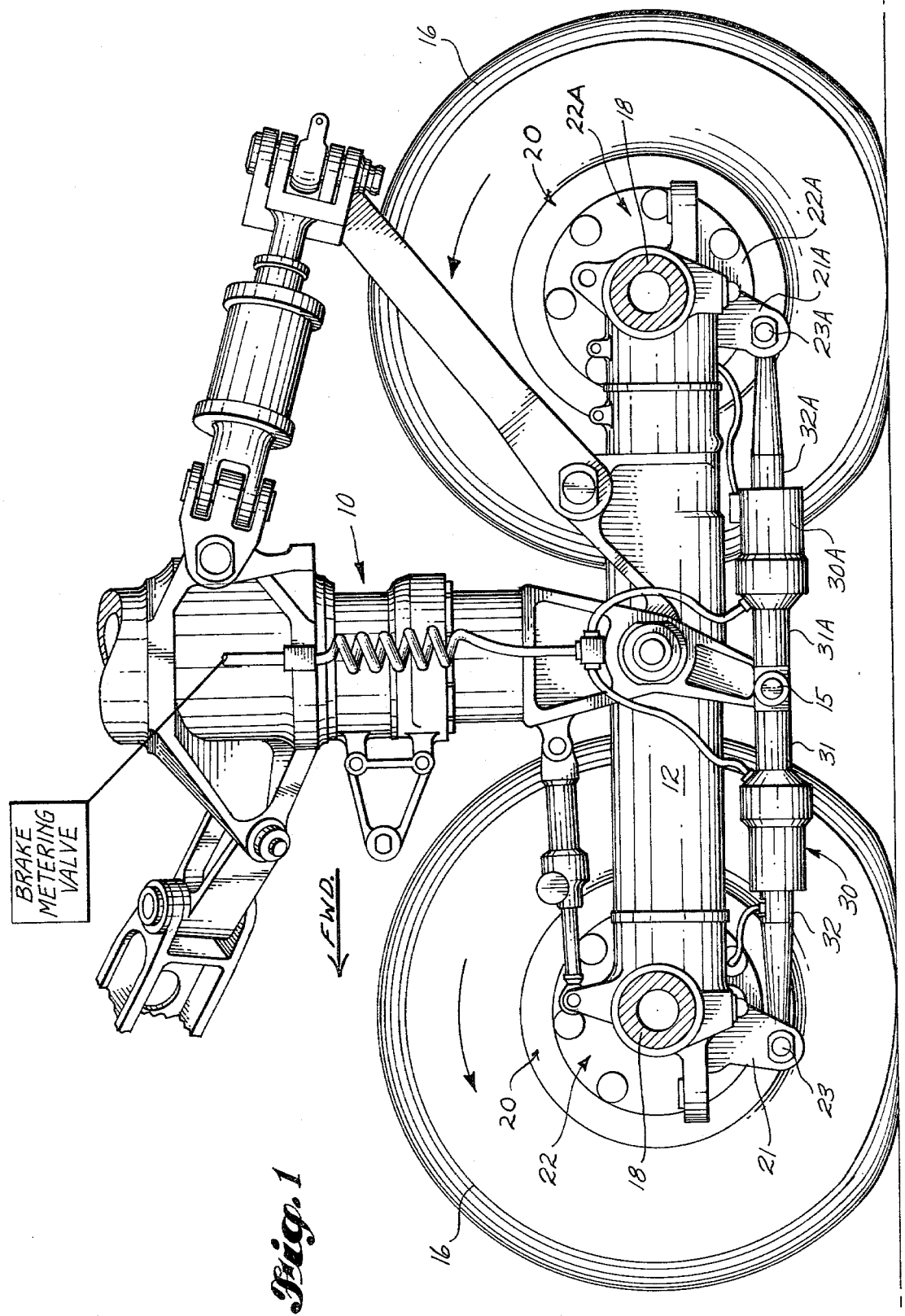
FIG. 1 is a side elevation view of a typical four-wheel bogie beam landing gear for an airplane, with only the two wheels on the far side of the bogie beam 12 shown.
Figure 2:
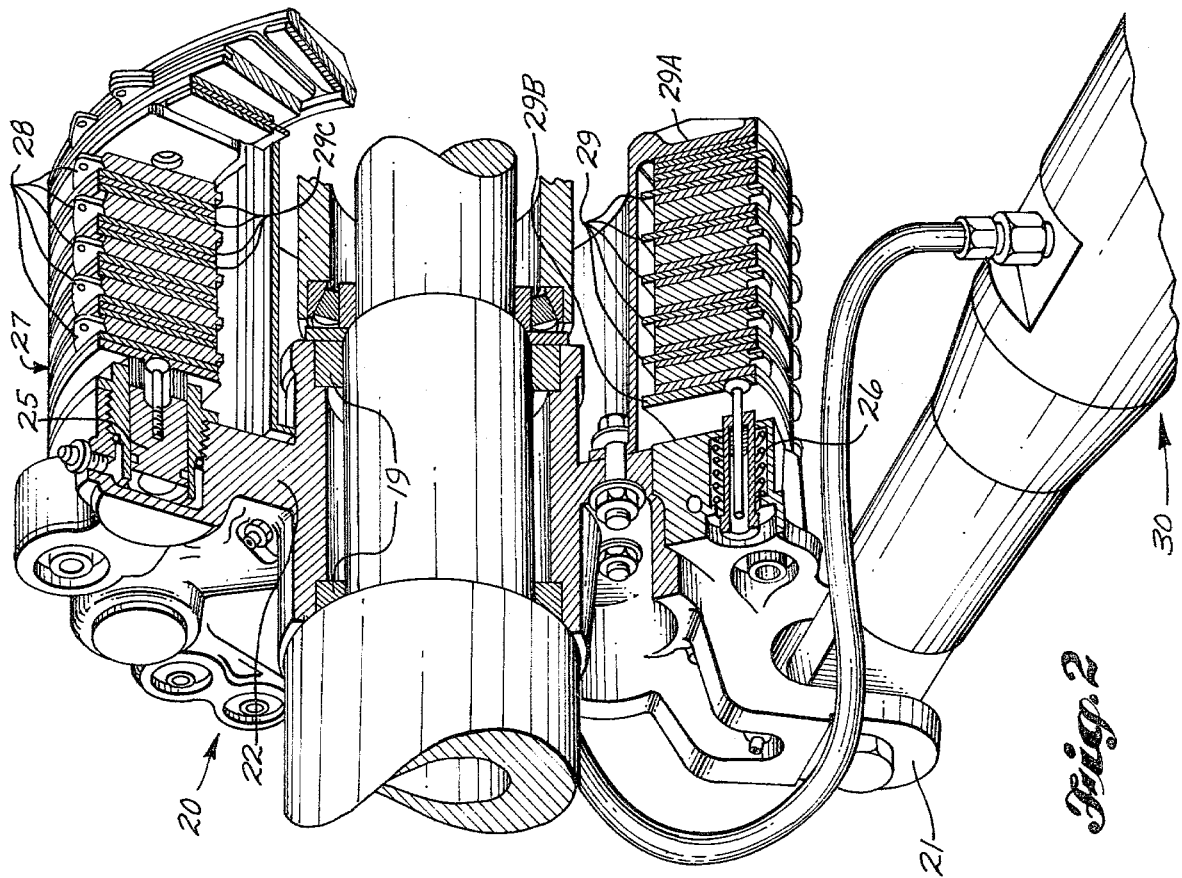
FIG. 2 is an enlarged detailed perspective view of a typical disc brake assembly generally used on landing gear truck assemblies.

FIG. 1 is a side elevation view of a typical four-wheel (only two wheels on the far side of the bogie beam 12 are shown); landing gear truck assembly; and a mounting arrangement for a disk brake assembly 20 which mounting arrangement is typical for most landing gear truck assemblies on airplanes. The disk brake assembly is mounted through a large journal bearing 19 (shown in FIG. 2) to the bogie beam 12 of the four-wheel truck assembly, so that the brake assembly is free to rotate relative thereto. The brake torque reaction of the disk brake assembly 20 is taken out through the torque arm 21 by a brake equilizing rod assembly 30 or 30A which runs from the brake carrier housing 22 to the bottom end at 15 of the landing gear strut 10. The brake equilizing rod assemblies 30 and 30A are at a convenient location for measuring braking torque and then applying a feed-back to control it.

If the disk brake assembly 20 were bolted directly to the bogie beam 12 of the four-wheel truck, the application of brakes while the wheels were rotating, would tend to tilt the bogie beam and likewise the entire four-wheel truck.

Figure 3C:
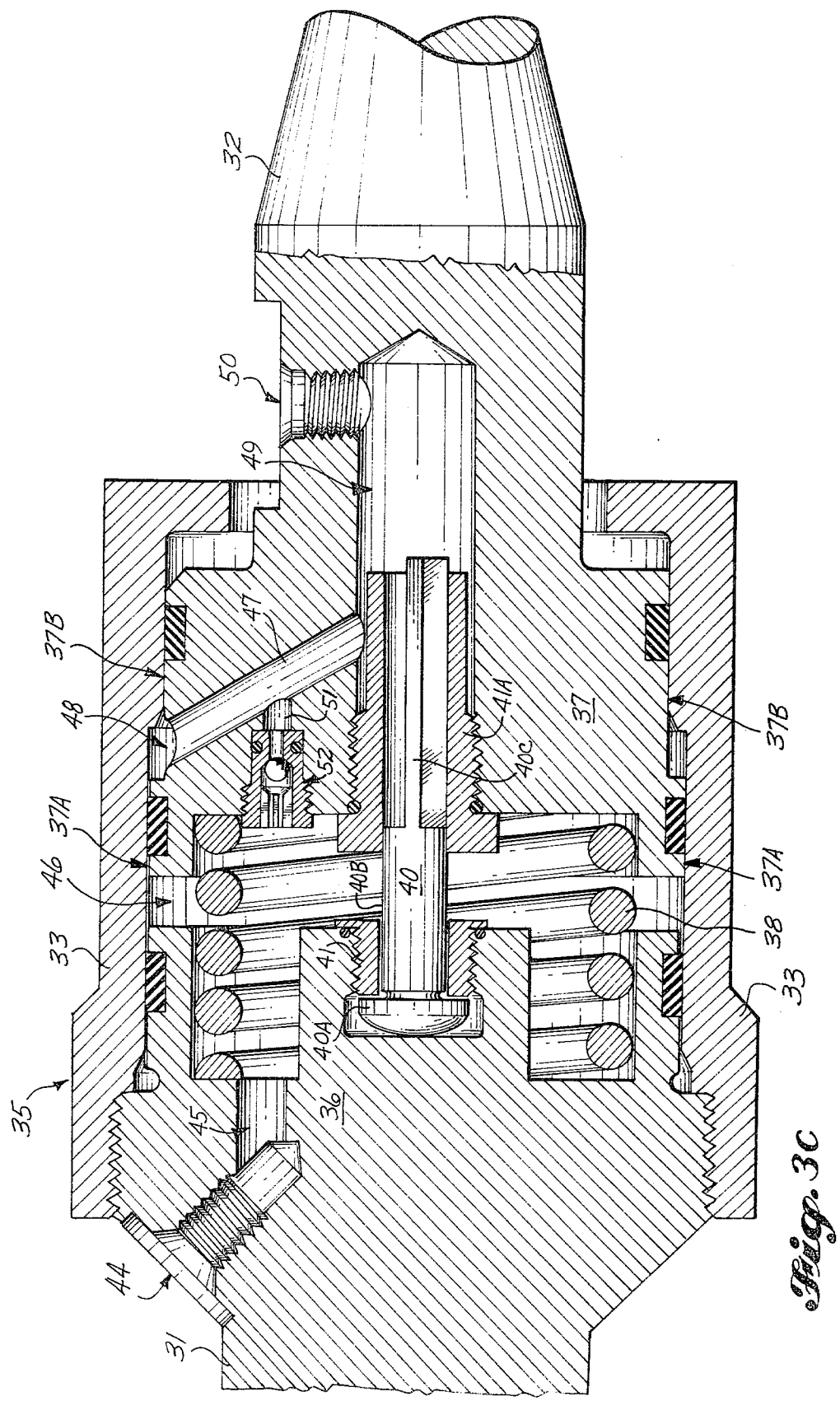
FIG. 3C is a view similar to FIG. 3 wherein the Brake Torque Limiter is at a partially compressed position.
Figure 3D:
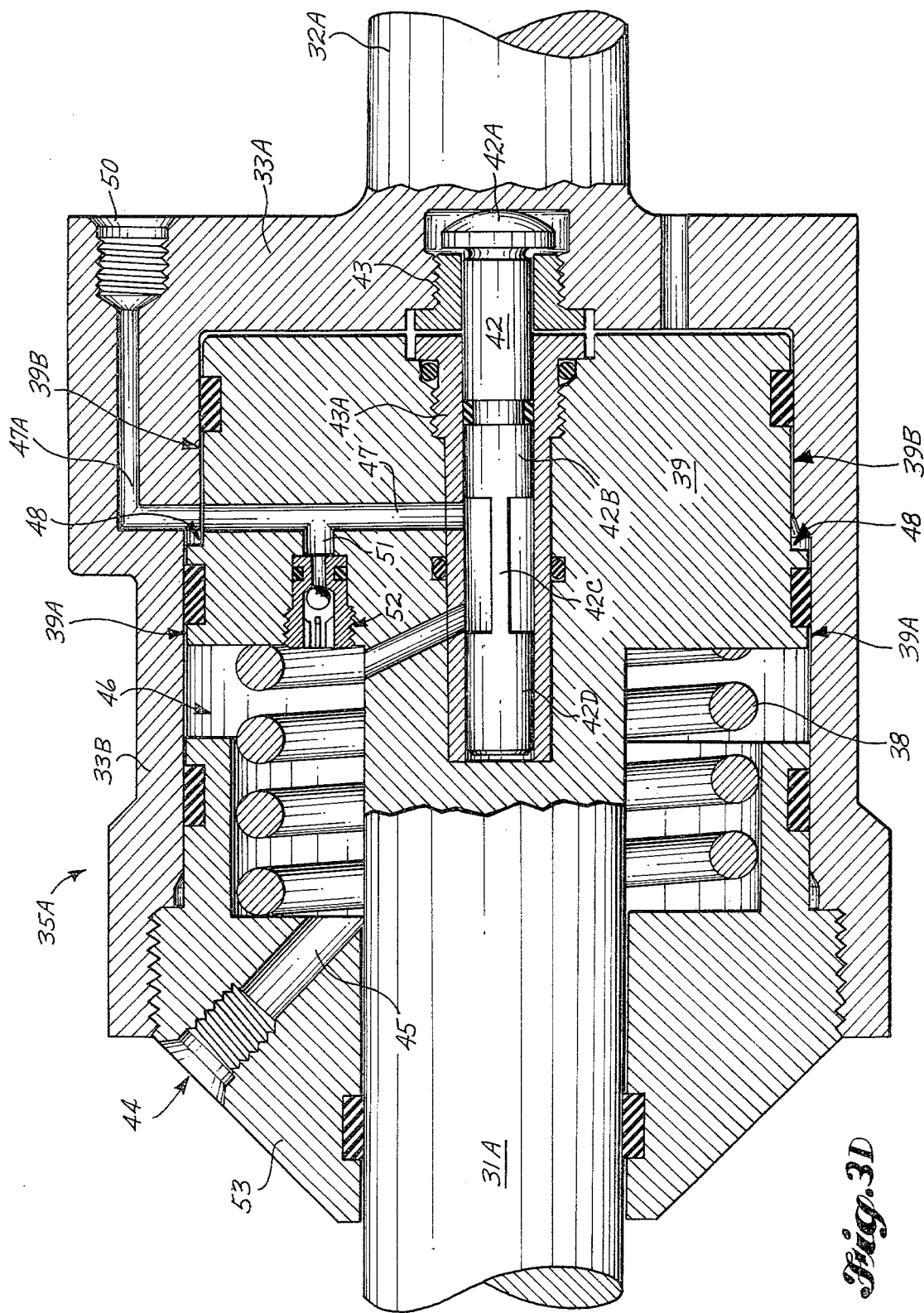
FIG. 3D is an enlarged detailed side cross-section view of a Brake Torque Limiter which is shown incorporated in the brake rod assembly 30A shown in FIG. 1 and which functions in tension.

FIG. 3 is an enlarged detail view of the preferred embodiment of a compressively activated BTL (Brake Torque Limiter) unit 35 incorporated within the brake rod assembly 30 depicted in a reversed position in FIG. 1; and FIG. 3D is a similar BTL (Brake Torque Limiter) unit 35A which is tension activated and incorporated within the brake rod assembly 30A, and depicted in a like position in FIG. 1. The compressively activated BTL unit 35 comprises: to the left in FIG. 3, the depicted broken-off end of the fixed brake rod segment 31 which is shown in a reversed position in FIG. 1 and which connects at 15 to the lower end of the landing gear strut 10; and to the right in FIG. 3, the depicted broken-off end of the movable brake rod segment 32 which is shown in a reversed position in FIG. 1 and which connects at 23 to brake torque arm 21 shown in FIGS. 1 and 2; and a union connector ring 33 for coupling the brake rod segments 31, 32 together into the single brake equalizing rod assembly 30.

The BTL comprises: a cylinder head section 36 formed integral with an end of the fixed brake rod segment 31; a dual-diameter stepped piston 37 having a large diameter section 37A of 4.24" and a small diameter section 37B of 3.94" formed integral with an end of the movable brake rod segment 32; and a centrally located control valve 40. It will be understood that the dimensions used herein are exemplary and are only inserted for a clearer understanding of the embodiments described since other values would apply depending upon the specific application.

The brake control valve 40 has a head 40A, an upper-shank portion 40B that is circular in cross-section, and a lower-shank portion 40C that is of triangular cross-section as shown in FIG. 3A which is a view taken in the direction indicated by 3A—3A in FIG. 3. The head 40A and upper-shank portion 40B are centrally inserted into the end of the cylinder head section 36 of the fixed brake rod segment 31 and retained therein by a threaded insert 41. The lower-shank portion 40C of control valve 40 is slidably mounted in a sleeve 41A which threadably engages the dual-diameter stepped piston 37. The triangular cross-section of the lower-shank portion 40C guides the control valve within the valve sleeve 41A and the shoulder, of the circular cross-section of the upper-shank portion 40B, serves as the fluid flow cut-off on the valve as will be explained hereinafter.

The shank or spool section of the control valve 40, is loosely fastened at its head end 40A to the cylinder head 36 by the threaded insert 41, and remains relatively stationary; and the valve sleeve 41A is fixedly attached through a threaded connection to the piston 37 and moves with said piston, relative to said valve spool. The relatively loose insertion of the valve spool 40 between the brake rod members 31 and 32, so that it floats a little bit, is necessary in order that the brake rod assembly 30 including within it the Brake Torque Limiter 35 is able to move without the valve binding.

In operation, when the pilot applies brakes, pressurized fluid from the pilot's brake fluid metering valve is directed through an inlet port 44, through conduit 45 and into a first chamber 46 formed between the cylinder head 36 and the piston 37. From this first chamber 46, the pressurized fluid flows through control valve 40 via the triangular cross-section of the lower shank portion 40C and into three fluid flow paths: a first path through conduit 49, outlet 50, to the brake piston assembly 25 (FIG. 2); a second path through conduits 47 and 51, ball-check valve 52 and back to the first chamber 46; a third path through conduit 47 into a second chamber 48 formed between the step section of the dual-diameter piston 37 and the housing or connector ring cylinder 33.

The difference between the diameters of pistons 37A and 37B, creates a piston step-face; and a matching cylinder step-face is created between the difference in the internal diameters of the cylinder 33. The initial net effective pressure area for resisting a brake torque reaction force through the movable brake rod segment 32 is determined by the smaller diameter section 37B of the dual-diameter piston 37. The smaller diameter section 37B is really the feel area because as long as the control valve 40 is in the open position permitting fluid flow therethrough, as shown in FIG. 3, the fluid pressure, which acts on both sides of the area difference between the large diameter (4.24) piston section 37A and the smaller diameter (3.94) piston section 37B, is balanced. Therefore, the pilot's meter fluid pressure times the 3.94 diameter area creates the force on the movable brake rod segment 32 which reacts the brake torque force. When the brake torque force reacting through the brake rod section 32, becomes greater than the pilot's metered fluid pressure times the 3.94 diameter area, the brake rod section 32 will move to the left as shown in FIG. 3C, or to the right as shown in FIG. 1 and the overall length of brake rod 30 due to compression, will decrease; and in so doing, closes off the fluid flow through the control valve 40 when the brake rod segment 32 moves a predetermined distance of approximately 0.075 inches for the example embodiment depicted. Thus, the pilot's metered fluid pressure is isolated from the brake assembly, shown in FIG. 2, and the only fluid pressure applied to the brakes is what was initially applied by the pilot's metering valve and is still trapped in the brake assembly.

Therefore, as the brake rod section 32 moves, to the left as shown in FIG. 3C or to the right in FIG. 1, the dual-diameter piston 37 slides in the dual-diameter cylinder 33 having matching stepped inner surface diameters; and an annulas chamber 48 is created and enlarged between the piston step-face and the cylinder step-face. This annulas space 48 creates a volume for the pressurized brake fluid, which is trapped in the brake assembly, to flow back into and thereby decrease its pressure. The magnitude of fluid pressure in brake piston assembly 25 (FIG. 2) is also the magnitude of fluid pressure, referring to FIG. 3C, in chambers 49 and 48; and when the control valve 40 is in the position shown in FIG. 3C, this magnitude of fluid pressure is isolated from the pilot's metered fluid pressure in chamber 46. Therefore, as the brake torque acting through torque arm 21, drives brake rod segment 32 to the right in FIG. 1 or to the left in FIG. 3C, the volume in chamber 48 increases resulting in a decrease in the magnitude of fluid pressure in chambers 48 and 49, and in the brake piston assembly 25 (FIG. 2); and this decreases the brake torque acting through arm 21. Referring to FIG. 3C, the movable dual-diameter piston 37 is in force balance when: on the one side, there is a force generated by the pilot's metered fluid pressure acting over the large diameter area 37A of the dual-diameter piston 37 or the piston head area; and on the other side, there is a counteracting force which is the summation of: (1) a mechanical force generated by brake torque acting through torque arm 21 and rod segment 32 to drive the dual-diameter piston 37 to the left in FIG. 3C; and (2) a hydraulic force generated by the magnitude of fluid pressure in brake piston assembly 25 (FIG. 2) acting through inlet 50, chamber 49, conduit 47 and into chamber 48 acting on the differential piston area. The pressure of the fluid from the brake piston assembly 25, continues to decrease as the dual-diameter piston 37 travels its maximum stroke distance for the example embodiment depicted, of 0.70 inches; at which position, the pressure of the fluid in the brake asembly should have decreased sufficiently so that the brake torque is substantially reduced.

Between the cylinder head 36 and the dual-diameter piston 37, is a preloaded compression spring 38 which functions to take the slack out therebetween, and to bias the overall length of the brake rod assembly 30 (in FIG. 1) into an extended position. The preloaded compression spring 38 does not significantly contribute to the extention of the brake rod 30; because, in comparing spring forces with forces produced by hydraulic pressure over an area, springs are relatively small force producing devices.

Figure 4:
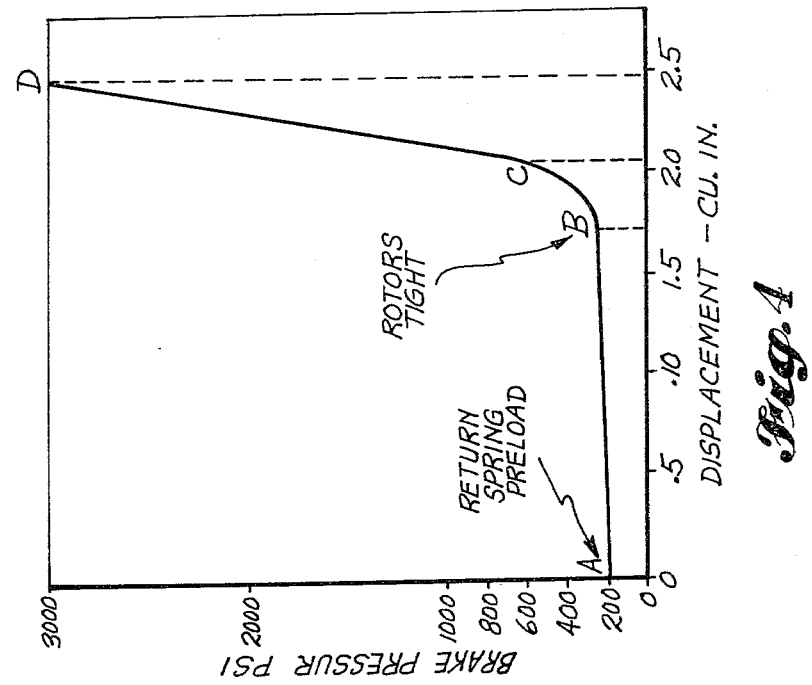
FIG. 4 is a graph of the applied pressurized fluid, required for operating between full brake torque or complete release of brake torque.

FIG. 4 is a graph of brake pressure vs. volume and the plotted solid line represents the pilot's metered fluid applied to the brake assembly for producing brake torque. The approximately horizontally sloped line segment A-B represents the volume, of the pilot's metered fluid, required for filling the pistons 25 of the brake assembly shown in FIG. 2 and compressing the return springs 26. Between points B and C the rotor and stator assembly 27 becomes stacked up solid so that upon reaching point C, the brake assembly starts creating some torque. The rotor and stator assembly comprises rotor disks 28 and stator disks 29 having friction linings 29C; and these assemblies 28, 29 are compressed between a static backing plate 29A and a static pressure plate 29B. As the pilot's metered fluid pressure increases the steep positive slope of line segment C-D represents the spring rate of the brake assembly and the rate of brake torque produced.

The brake disc assembly housing 22 functions in a manner similar to that of a large C-clamp having a bunch of stators and rotors in between; and as the pressure increases between the C-clamp members, they deflect outwardly and the amount of this deflection causes the degree-of-slope, of the line segment C-D. Theoretically, if the C-clamp were made strong enough, the slope of the line segment C-D would be vertical; however, as a practical matter, the deflection characteristics of the C-clamp will generally result in a sloped line similar to segment C-D.

From point C to the peak pressure of 3000 psi., at point D, the fluid displacement volume of the brake disk piston 25 assembly, is approximately five-tenths of a cubic inch (0.5 cu. in.). This indicates that by backing-off in fluid pressure volume by 0.5 cu. in., that the brake torque will in effect be released down to zero. Therefore, if this volume of pressurized fluid is removed from the brake assembly when the brake fluid is at its peak pressure of 3000 psi., or at its maximum peak pressure, the effective braking torque will be released. So if the Brake Torque Limiter, shown in FIGS. 3, 3C is to operate over the effective brake torque range, the annulas chamber 48 has to have the volumetric capacity to allow 0.5 cu. in. of pressurized fluid to come out of the disk brake piston 25 assembly. Actually, the Brake Torque Limiter has to operate only over a relatively small volumetric range, in order to bring the pressure of the brake fluid, acting in the disk brake piston assembly, back down to some value which is equivalent to the amount of brake torque that was designed to correspond ratio-wise with the amount that the pilot has metered. In FIG. 4, the volumetric range is determined by the amount of decrease in fluid pressure desired, down the slope of the pressure-volume line segment D-C. In the Brake Torque Limiter, this function will take place independently of the pilot's metered fluid pressure i.e., with the pilot maintaining a constant metered fluid pressure by a constant position of the brake pedal.

For example, with respect to present known conventional brake systems, assume that the pilot meters a fluid pressure of 1500 psi.: then the brake will put out some torque that is a function (X) of 1500 psi. But, the difficulty is that the function (X) is unknown, it may be a high-ratio or a low-ratio depending upon whether the brakes are wet or dry, hot or cold, etc. It would be desirable e.g., that if the pilot were to meter a fluid pressure of 1500 psi., that the brakes would always, say, put out 15,000 ft. lbs. of torque i.e., a ratio of 1:10. But in actual fact they may put out anywhere from 5,000 to 20,000 ft. lbs. of torque and that is where the difficulty is.

Therefore, the primiary object of the present invention is to provide a means for producing brake torque which is consistant with the fluid pressure that is being metered. So that if the pilot meters 1500 psi. and the amount of brake torque produced is greater than what has been predetermined as the desirable amount, then the provided means will simply cause the fluid pressure applied to the disk brake piston assembly, to back down until a brake torque of 15,000 ft. lbs. is being produced. The amount that it backs down would depend upon how the provided means or Brake Torque Limited of the present invention, was built and what the function (X) relationship is.

For example, assume that the preferred embodiment of the Brake Torque Limiter shown in FIGS. 3, 3C, was built with the following dimensions: a dual-diameter piston 37 with a large diameter piston 37A of 4.2 inches providing an area of 14.1 sq. inches; a small diameter piston 37B of 3.9 inches providing an area of 12.2 sq. inches; and the difference between these two areas being 1.9 sq. inches. When the pilot's brake metering valve inputs a fluid pressure of 3,000 psi. to the Brake Torque Limiter, this pressurized fluid enters into a first chamber 46 and through the open control valve 40, into a second chamber 48. This results in the small area of 1.9 sq. inches being fluid pressure balanced on both sides of the large diameter piston 37A so that it doesn't feel any force as a result of the fluid pressure. So, the fluid pressure of 3,000 psi. times the 12.2 sq. inches of piston area, produces a force of 36,600 lbs. which is applied to the rod section 32. The disc brake assembly, FIG. 2, has a torque arm length of 9.5 inches, so the force of 36,600 lbs. times the arm length of 9.5 and divided by 12 to convert to feet, will result in producing 28,837 ft. lbs. of torque. Therefore, in this example, the Brake Torque Limiter is designed to provide a 28,837 ft. lb. torque limit at 3,000 psi.; and the function (X) relationship (28,837:3,000) or 9.6:1.

A reduction in brake torque is accomplished in the following manner. When the pilot applies a metered fluid pressure of 3,000 psi., through the Brake Torque Limiter, to the disc brake piston assembly, a brake torque is produced which is transmitted through the brake rod 30, to the bogie landing gear strut 10. When the brake assembly puts out a torque in excess of the designed 28,837 ft. lb. torque limit, the brake rod 30 begins to collapse in compression through movement of brake rod segment 32. When brake rod segment 32 moves a distance of 0.075 inches relative to brake rod segment 31, the fluid flow through the control valve 40 will be stopped i.e., the pilot's metered fluid pressure flow will be cut-off from the disc brake piston assembly. With the pressurized fluid in the second chamber 48 being isolated from the pilot's metered fluid pressure in chamber 46, any further collapsing movement of the brake rod assembly 30 from initial amount of 0.075 inches, will force a small amount of fluid back up against the pilot's metering valve which is so constructed as to permit this slight amount of fluid backflow. Also, any further collapsing movement of the brake rod assembly 30 from the initial amount of 0.075 inches, as shown in FIG. 3C, will allow the pressurized fluid in the disc brake piston assembly to flow back into the volume of the donut-shaped chamber 48, which volume increases as the brake rod assembly continues to collapse in compression. As the chamber 48 increases in volume, it allows the brake fluid to flow back into it and causes the pressure, referring to FIG. 4 to slide back down the pressure-volume line segment D-C. As the pressure of the trapped brake fluid decreases the brake piston force applied to the stacked stator and rotor discs of the brake assembly becomes less and this results in a decrease in the brake torque output until the brake torque equals 9.6 times the pilot metered pressure. If the brake torque output decays further, the dual-diameter piston 37 will move back towards the right, to the position shown in FIGS. 3C, due to the pilot's metered fluid pressure in chamber 46 now producing a greater force on the brake rod section 32 than the opposing brake torque. As soon as the piston 37 moves towards the right to the point where fluid flow through the control valve 40 is opened up again, then the pilot's metered fluid pressure will again be connected directly to the disc brake piston assembly for reapplying brake torque.

Referring to the ball-check valve 52 in FIGS. 3, and 3C. The ball has its seat to the right and a fluted passage to the left which provides an area through which fluid flow occurs; therefore, the ball-check valve functions to block fluid flow from chamber 46. FIG. 3B is a front view of the ball-check valve 52, taken in the direction indicated by 3B—3B in FIG. 3 to more clearly show the fluted passage through which fluid flow occurs. The purpose for the ball-check valve 52 is as follows: Assume that the pilot has applied a maximum fluid pressure of 3,000 psi. as depicted in FIG. 4, for a minimum braking effort and that the brake torque has exceeded the design 28,837 ft. lb. torque limit to move the piston 37 to the position where the fluid flow through the control valve 40 has been cut-off, as shown in FIG. 3C, and then the pilot suddenly removes his foot from the brake pedal to release the brakes.

Without the ball-check valve 52, the pressurized fluid trapped in the disc brake piston assembly and the annular chamber 48, would further collapse the brake rod assembly 30, but these would be a sufficient amount of fluid pressure remaining, refer to FIG. 4 line segment C-A, to maintain the disc brake piston assembly force tightly against the stacked stator and rotor discs, and continue to produce some brake torque. This condition is not desirable because under no circumstances should there be a higher fluid pressure in the disc brake piston assembly than the pilot is metering. It is intolerable to have fluid pressure applied to the brakes when the pilot doesn't intend to apply it. So, there has to be some means for immediately dumping the fluid pressure from the disc brake piston assembly whenever the pilot suddenly removes his foot off the brake pedal; and the ball-check valve 52 provides such means and allows the brake piston assembly to dump its fluid pressure back into chamber 46.

The spring 38 will extent the brake rod assembly 30 back to its inactive or unpressurized position if it has been shortened or collapsed, so that it is ready to start functioning over again.

FIG. 3D shows the tension activated BTL which is incorporated into the single brake equalizing rod assembly 30A, shown in FIG. 1, comprising: a fixed brake rod segment 31A which is connected at one end, at 15 as shown in FIG. 1, to the bottom of the landing gear strut 10, and at the other end it is integrally formed into a dual-diameter stepped piston 39; and a movable brake rod segment 32A connected at one end, at 23A as shown in FIG. 1, to the brake torque arm 21A, and at the other end it is integrally formed into a cylinder head section 33A having a cylinder wall section 33B with a threadably attached end cap ring 53 that slidably encloses the piston 39 of the fixed rod segment 31A. The dual-diameter stepped piston 39 has a large diameter section 39A, a small diameter section 39B and a centrally positioned control valve 42; and it will be understood that dimensions of the compression activated BTL shown in FIGS. 3 and 3C, would apply equally to the tension activated BTL shown in FIG. 3D.

The brake control valve 42 (which is somewhat similar to the valve 40 in FIGS. 3 and 3C) has a head 42A, an upper-shank portion 42B that is circular in cross-section, a central-shank portion 42C that is of triangular cross-section as shown in FIG. 3A, and a lower spool portion 42D that is circular in cross-section. The head 42A and a section of the upper-shank 42B are centrally inserted into the end of the cylinder head section 33A of the movable brake rod segment 32A and retained therein by a threaded insert 43. The central-shank portion 42C and lower spool portion 42D, of control valve 42, are slidably mounted within a sleeve 43A which is threadably connected to the dual-diameter stepped piston 39. The circular cross-section of the lower spool portion 42D guides the control valve within the valve sleeve 43A and a shoulder, formed between the spool 42D and the triangular cross-section central-shank portion 42C, serves as the fluid flow cut-off on the valve, as will be explained hereinafter.

In operation, when the pilot applies brakes, pressurized fluid from the pilot's brake fluid metering valve is directed through an inlet port 44, through conduit 45 and into a first chamber 46 formed between the cylinder end cap ring 53 and the piston 39. From this first chamber 46, the pressurized fluid flows through control valve 42 via the triangular cross-section of the central-shank portion 42C and branches into two fluid flow paths: a first path through conduits 47 and 51, through ball-check valve 52 and returns to the first chamber 46; and a second path through conduit 47 into a second chamber 48, formed between the step section of the dual-diameter piston 39 and the cylinder wall section 33B, and from there through conduit 47A and outlet 50, to the brake piston assembly 25 shown in FIG. 2.

Also, as previously described with respect to the compression activated Brake Torque Limiter 35 shown in FIGS. 3, 3C, in the tension activated Brake Torque Limiter 35A shown in FIG. 3D, the difference between the diameters of pistons 39A and 39B, creates a piston step-face; and a matching cylinder step-face is created between the difference in the internal diameters of the cylinder wall section 33B. The initial net effective pressure area for resisting a brake torque reaction force through the movable brake rod segment 32A is determined by the smaller diameter section 39B of the dual-diameter piston 39. The smaller diameter section 39B is really the feel area because as long as the control valve 42 is in the open position, as shown in FIG. 3D, permitting fluid flow therethrough via the triangular cross-section of the central-shank portion 42C, the fluid pressure will act on both sides of the area difference between the large diameter (4.24) piston section 39A and the smaller diameter (3.94) piston section 39B, and this area difference will be in fluid pressure balance. Therefore, the pilot's metered fluid pressure times the 3.94 diameter area creates the total force that the tension movable brake rod segment 32A has, to react against the brake torque force. When the tension brake torque force reacting through the movable brake rod segment 32A, becomes greater than the pilot's metered fluid pressure times the 3.94 diameter area, then the brake rod section 32A will be pulled to the right as shown in FIG. 3D, or the overall length of brake rod 30A due to tension, will increase; and in so doing, the fluid flow through the control valve 42 will be closed off, when the brake rod segment 32A moves in extension a predetermined distance of approximately 0.075 inches for the example embodiment depicted. Thus, the pilot's metered fluid pressure is isolated from the brake assembly, shown in FIG. 2, and the only fluid pressure applied to the brakes is what was initially applied by the pilot's metering valve and is still trapped in the brake assembly.

Therefore, as the brake rod section 32A moves, to the right in FIG. 3D, the dual-diameter cylinder wall section 33B slides relative to the dual-diameter piston 39; and the volume of annulas chamber 48 is enlarged between the piston step-face and the cylinder step-face. This annulas space 48 creates a volume for the pressurized brake fluid, which is trapped in the brake assembly, to flow back into and thereby decrease its pressure. The pressure of the fluid from the brake assembly, continues to decrease as the movable cylinder 33B travels relative to the fixed dual-diameter piston 39, a maximum predetermined stroke distance for the example embodiment depicted, of 0.70 inches; at which position, the pressure of the fluid in the brake assembly should have decreased sufficiently so that the brake torque is substantially reduced in an manner similar to that described with respect to the compression BTL shown in FIGS. 3 and 3C.

While the invention has been disclosed with reference to preferred embodiments, it is to be understood that those modifications and changes which become obvious to a person skilled in the art to which this invention pertains, as a result of the teachings hereof, are considered to be encompassed by the following claims.

I claim:

1. A torque responsive brake control apparatus for controlling a fluid pressure operated brake mechanism, operatively connected to a rotatable member, comprising: said fluid pressure operated brake mechanism being mounted substantially coaxial with said rotatable member and adapted for exerting a braking force to resist rotation of said rotatable member; a metering valve being manually operated for controlling a flow of pressurized fluid to said brake mechanism; a torque arm connected to said brake mechanism; said torque arm being angularly movable in response to brake reaction torque associated with said rotatable member when a braking force is applied to resist rotation of said rotatable member; said torque responsive control apparatus having a brake rod assembly attached at one end to said torque arm and attached at an opposite end to a fixed support; said brake rod assembly being arranged between said torque arm and said fixed support, for resisting angular displacement of said torque arm; a brake torque limiter incorporated within said brake rod assembly and being interposed in the fluid circuit between said manually operated metering valve and said brake mechanism, for controlling the supply and release of fluid under pressure to and from said brake mechanism; said brake torque limiter comprising a cylinder head section with a dual-diameter internally stepped cylinder section, and a matching dual-diameter stepped piston slidably mounted therein; said brake rod assembly comprising a first brake rod segment fixedly attached to said dual-diameter stepped piston, and a second brake rod segment fixedly attached to said dual-diameter stepped cylinder and head section of said brake torque limiter; a first chamber formed between said cylinder head section and said dual-diameter stepped piston; said brake torque limiter being constructed and arranged with respect to said brake rod assembly, so as to normally bias said brake rod assembly in one direction of extending said brake rod assembly to its maximum overall length, by directing fluid pressure from said manually operated metering valve into said first chamber, and in the opposite direction for decreasing the overall length of said brake rod assembly by torque resulting from application of brakes; a control valve incorporated within said brake torque limiter and interposed in the fluid circuit through which fluid under pressure from said manually operated metering valve, is supplied to the brake mechanism; said control valve being normally in an open position, when said brake rod assembly is at its maximum overall length, for circulating fluid pressure from said metering valve through said control valve to said brake mechanism; said control valve being actuated to a closed position, when said brake rod assembly is decreased from its maximum overall length by predetermined excessive braking torque of said rotatable member, for blocking fluid flow between said brake mechanism and said manually operated metering valve, and for trapping metered fluid pressure between said brake torque limiter and said brake mechanism; a second chamber formed between said step sections of the dual-diameter piston and matching internal dual-diameter cylinder, for creating an expanding annulus volume in response to contraction of the overall length of said brake rod assembly, to receive hydraulic fluid trapped between said brake torque limiter and said brake mechanism, and thereby decrease the pressure of said trapped hydraulic fluid resulting in a decrease in the ratio of brake torque reaction relative to metered hydraulic pressure.

2. A torque responsive brake control apparatus for controlling a fluid pressure operated brake mechanism, operatively connected to a rotatable member, comprising: said fluid pressure operated brake mechanism being mounted substantially coaxial with said rotatable member and adapted for exerting a braking force to resist rotation of said rotatable member; a metering valve being manually operated for controlling a flow of pressurized fluid to said brake mechanism; a torque arm connected to said brake mechanism; said torque arm being angularly movable in response to brake reaction torque associated with said rotatable member when a braking force is applied to resist rotation of said rotatable member; said torque responsive control apparatus having a brake rod assembly attached at one end to said torque arm and attached at an opposite end to a fixed support; said brake rod assembly being arranged between said torque arm and said fixed support, for resisting angular displacement of said torque arm; a brake torque limiter incorporated within said brake rod assembly and being interposed in the fluid circuit between said manually operated metering valve and said brake mechanism, for controlling the supply and release of fluid under pressure to and from said brake mechanism; said brake torque limiter comprising a cylinder head section with a dual-diameter internally stepped cylinder section, and a matching dual-diameter stepped piston slidably mounted therein; said brake rod assembly comprising a first brake rod segment fixedly attached to said dual-diameter stepped piston, and a second brake rod segment fixedly attached to said dual-diameter stepped cylinder and head section of said brake torque limiter; a first chamber formed between said cylinder head section and said dual-diameter stepped piston; said brake torque limiter being constructed and arranged with respect to said brake rod assembly, so as to normally bias said brake rod assembly in one direction of contracting said brake rod assembly to its minimum overall length, by directing fluid pressure from said manually operated metering valve into said first chamber, and in the opposite direction for increasing the overall length of said brake rod assembly by torque resulting from application of brakes; a control valve incorporated within said brake torque limiter and interposed in the fluid circuit through which fluid under pressure from said manually operated metering valve, is supplied to the brake mechanism; said control valve being normally in an open position, when said brake rod assembly is at its minimum overall length, for circulating fluid pressure from said metering valve through said control valve to said brake mechanism; said control valve being actuated to a closed position, when said brake rod assembly is increased from its minimum overall length by predetermined excessive braking torque of said rotatable member, for blocking fluid flow between said brake mechanism and said manually operated metering valve, and for trapping metered fluid pressure between said brake torque limiter and said brake mechanism; a second chamber formed between said step sections of the dual-diameter piston and matching internal dual-diameter cylinder, for creating an expanding annulus volume in response to extension of the overall length of said brake rod assembly, to receive hydraulic fluid trapped between said brake torque limiter and said brake mechanism, and thereby decrease the pressure of said trapped hydraulic fluid resulting in a decrease in the ratio of brake torque reaction relative to metered hydraulic pressure.

3. An individual wheel torque responsive brake control apparatus for controlling a fluid pressure operated brake mechanism mounted substantially coaxial with a vehicle wheel in rolling contact with the ground, said apparatus comprising: a metering valve being manually operated for controlling flow of pressurized fluid to said brake mechanism; a torque arm connected to said brake mechanism and being angularly movable in response to brake reaction torque, associated with frictional adhesion between said vehicle wheel and the ground, when a braking force is applied to resist rotation of said wheel; a brake rod assembly attached at one end to said torque arm and attached at an opposite end to fixed support structure of said vehicle wheel, for resisting angular displacement of said torque arm; a brake torque limiter incorporated within said brake rod assembly and being interposed in the fluid circuit between said manually operated metering valve and said brake mechanism, for controlling the supply and release of fluid under pressure to and from said brake mechanism; said brake torque limiter comprising a cylinder head section with a dual-diameter internally stepped cylinder section, and a matching dual-diameter stepped piston slidably mounted therein; said brake rod assembly comprising a first brake rod segment fixedly attachd to said dual-diameter stepped piston, and a second brake rod segment fixedly attached to said dual-diameter stepped cylinder and head section of said brake torque limiter; a first chamber formed between said cylinder head section and said dual-diameter stepped piston; said brake torque limiter being constructed and arranged with respect to said brake rod assembly, so as to normally bias said brake rod assembly in one direction by directing fluid pressure from said manually operated metering valve into said first chamber, to extend in overall length said brake rod assembly, and in the opposite direction by reaction torque, associated with frictional adhesion between said vehicle wheel and the ground resulting from application of brakes, to contract said brake rod assembly; a control valve incorporated within said brake torque limiter and interposed in the fluid circuit through which fluid under pressure, from said manually operated metering valve, is supplied to the brake mechanism; said control valve being normally in an open position, when said brake rod assembly is at a fully extended operative position, for circulating fluid pressure from said metering valve through said control valve to said brake mechanism; said control valve being actuated to a closed position when said brake rod assembly is retracted from said fully extended operative position by a predetermined excessive braking torque of said vehicle wheel, for blocking fluid flow between said brake mechanism and said manually operated metering valve, and for trapping metered fluid pressure between said brake torque limiter and said brake mechanism; and a second chamber formed between said step sections of the dual-diameter piston and matching internal dual-diameter cylinder, for creating an expanding annulus volume in response to contraction of the overall length of said brake rod assembly, for occupation by fluid pressure trapped between said brake torque limiter and said brake mechanism, to decrease pressure of said trapped fluid and thereby lower the amount of brake torque reaction relative to metered fluid pressure.

4. An individual wheel torque responsive brake control apparatus for controlling a fluid pressure operated brake mechanism mounted substantially coaxial with a vehicle wheel in rolling contact with the ground, said apparatus comprising: a metering valve being manually operated for controlling flow of pressurized fluid to said brake mechanism; a torque arm connected to said brake mechanism and being angularly movable in response to brake reaction torque, associated with frictional adhesion between said vehicle wheel and the ground, when a braking force is applied to resist rotation of said wheel; a brake rod assembly attached at one end to said torque arm and attached at an opposite end to fixed support structure of said vehicle wheel, for resisting angular displacement of said torque arm; a brake torque limiter incorporated within said brake rod assembly and being interposed in the fluid circuit between said manually operated metering valve and said brake mechanism, for controlling the supply and release of fluid under pressure to and from said brake mechanism; said brake torque limiter comprising a cylinder head section with a dual-diameter internally stepped cylinder section, and a matching dual-diameter stepped piston slidably mounted therein; said brake rod assembly comprising a first brake rod segment fixedly attached to said dual-diameter stepped piston, and a second brake rod segment fixedly attached to said dual-daimeter stepped cylinder and head section of said brake torque limiter; a first chamber formed between said cylinder head section and said dual-diameter stepped piston; said brake torque limiter being constructed and arranged with respect to said brake rod assembly, so as to normally bias said brake rod assembly in one direction by directing fluid pressure from said manually operated metering valve into said first chamber, to contract in overall length said brake rod assembly, and in the opposite direction by reaction torque, associated with frictional adhesion between said vehicle wheel and the ground resulting from application of brakes, to extend said brake rod assembly; a control valve incorporated within said brake torque limiter and interposed in the fluid circuit through which fluid under pressure, from said manually operated metering valve, is supplied to the brake mechanism; said control valve being normally in an open position, when said brake rod assembly is at a fully retracted operative position, for circulating fluid pressure from said metering valve through said control valve to said brake mechanism; said control valve being actuated to a closed position when said brake rod assembly is extended from said fully contracted operative position by a predetermined excessive braking torque of said vehicle wheel, for blocking fluid flow between said brake mechanism and said manually operated metering valve, and for trapping metered fluid pressure between said brake torque limiter and said brake mechanism; and a second chamber formed between said step sections of the dual-diameter piston and matching internal dual-diameter cylinder, for creating an expanding annulus volume in response to extension of the overall length of said brake rod assembly, for occupation by fluid pressure trapped between said brake torque limiter and said brake mechanism, to decrease pressure of said trapped fluid and thereby lower the amount of brake torque reaction relative to metered fluid pressure.

5. An individual aircraft wheel torque responsive brake control apparatus for controlling a hydraulically actuated aircraft wheel disc brake assembly having a housing mounted substantially coaxial with a wheel axle of a landing gear strut and rotatable relative thereto, said apparatus comprising: a metering valve being pilot operated for controlling flow of hydraulic pressure to said disc brake assembly; a torque arm fixedly attached to said disc brake assembly housing and being angularly movable therewith about said wheel axle, in response to braking reaction torque, associated with frictional adhesion between an aircraft wheel and runway surface, when a braking force is applied to resist rotation of said aircraft wheel; a brake rod assembly connected at one end to said torque arm and connected at an opposite end to the landing gear strut, for resisting angular displacement of said torque arm and for transmitting braking torque reaction force from said disc brake assembly housing to said landing gear strut; a brake torque limiter incorporated within said brake rod assembly and being interposed in a hydraulic circuit between said pilot operated metering valve and said disc brake assembly, for controlling the supply and release of hydraulic pressure to and from said disc brake assembly; said brake torque limiter comprising a cylinder head section with a dual-diameter internally stepped cylinder section, and a matching dual-diameter stepped piston slidably mounted therein; said brake rod assembly comprising a first brake rod segment fixedly attached to said dual-diameter stepped piston, and a second brake rod segment fixedly attached to said dual-diameter stepped cylinder and head section of said brake torque limiter; a first chamber formed between said cylinder head section and said dual-diameter stepped piston; said brake torque limiter being constructed and arranged with respect to said brake rod assembly, so as to normally bias said brake rod assembly in one direction to extend in overall length by directing hydraulic pressure from said pilot operated metering valve into said first chamber, and in the opposite direction to contract said brake rod assembly by reaction torque generated by frictional adhesion between the aircraft wheel and runway during application of braking force; a control valve incorporated within said brake torque limiter and interposed in the hydraulic circuit through which hydraulic pressure, from said pilot operated metering valve, is supplied to said disc brake assembly; said control valve being normally in an open position, when said brake rod assembly is at a fully extended operative position, for circulating hydraulic pressure from said metering valve through said control valve to said disc brake assembly; said control valve being actuated to a closed position, when said brake rod assembly is contracted from said fully extended operative position by a predetermined excessive braking torque of said aircraft wheel, for blocking hydraulic flow between said disc brake assembly and said pilot operated metering valve, and for trapping metered hydraulic pressure between said brake torque limiter and said disc brake assembly; and a second chamber formed between said step sections of the dual-diameter piston and matching internal dual-diameter cylinder, for creating an expanding annulus volume in response to contraction of the overall length of said brake rod assembly, to receive hydraulic fluid trapped between said brake torque limiter and said disc brake assembly, and thereby decrease the pressure of said trapped hydraulic fluid resulting in a decrease in the ratio of brake torque reaction relative to metered hydraulic pressure.

6. An individual aircraft wheel torque responsive brake control apparatus for controlling a hydraulically actuated aircraft wheel disc brake assembly having a housing substantially coaxial with a wheel axle of a landing gear strut and rotatable relative thereto, said apparatus comprising: a metering valve being pilot operated for controlling flow of hydraulic pressure to said disc brake assembly; a torque arm fixedly attached to said disc brake assembly housing and being angularly movable therewith about said wheel axle, in response to braking reaction torque, associated with frictional adhesion between an aircraft wheel and runway surface, when a braking force is applied to resist rotation of said aircraft wheel; a brake rod assembly connected at one end to said torque arm and connected at an opposite end to the landing gear strut, for resisting angular displacement of said torque arm and for transmitting braking torque reaction force from said disc brake assembly housing to said landing gear strut; a brake torque limiter incorporated within said brake rod assembly and being interposed in a hydraulic circuit between said pilot operated metering valve and said disc brake assembly, for controlling the supply and release of hydraulic pressure to and from said disc brake assembly; said brake torque limiter comprising a cylinder head section with a dual-diameter internally stepped cylinder section, and a matching dual-diameter stepped piston slidably mounted therein; said brake rod assembly comprising a first brake rod segment fixedly attached to said dual-diameter stepped piston, and a second brake rod segment fixedly attached to said dual-diameter stepped cylinder and head section of said brake torque limiter; a first chamber formed between said cylinder head section and said dual-diameter stepped piston; said brake torque limiter being constructed and arranged with respect to said brake rod assembly, so as to normally bias said brake rod assembly in one direction to contract in overall length by directing hydraulic pressure from said pilot operated metering valve into said first chamber, and in the opposite direction to extend said brake rod assembly by reaction torque generated by frictional adhesion between the aircraft wheel and runway during application of braking force; a control valve incorporated within said brake torque limiter and interposed in the hydraulic circuit through which hydraulic pressure, from said pilot operated metering valve, is supplied to said disc brake assembly; said control valve being normally in an open position, when said brake rod assembly is at a fully contracted operative position, for circulating hydraulic pressure from said metering valve through said control valve to said disc brake assembly; said control valve being actuated to a closed position, when said brake rod assembly is extended from said fully contracted operative position by a predetermined excessive braking torque of said aircraft wheel, for blocking hydraulic flow between said disc brake assembly and said pilot operated metering valve, and for trapping metered hydraulic pressure between said brake torque limiter and said disc brake assembly; and a second chamber formed between said step sections of the dual-diameter piston and matching internal dual-diameter cylinder, for creating an expanding annulus volume in response to extension of the overall length of said brake rod assembly, to receive hydraulic fluid trapped between said brake torque limiter and said disc brake assembly, and thereby decrease the pressure of said trapped hydraulic fluid resulting in a decrease in the ratio of brake torque reaction relative to metered hydraulic pressure.

* * * * *